Oct. 6, 1953
A. L. LUCARELLI
2,654,181
SEALING APPARATUS
Filed Nov. 15, 1949
3 Sheets-Sheet 1
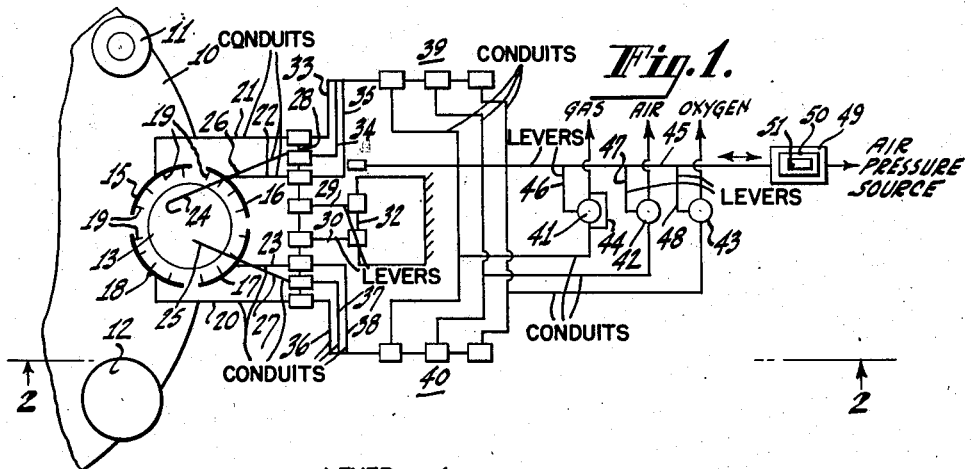
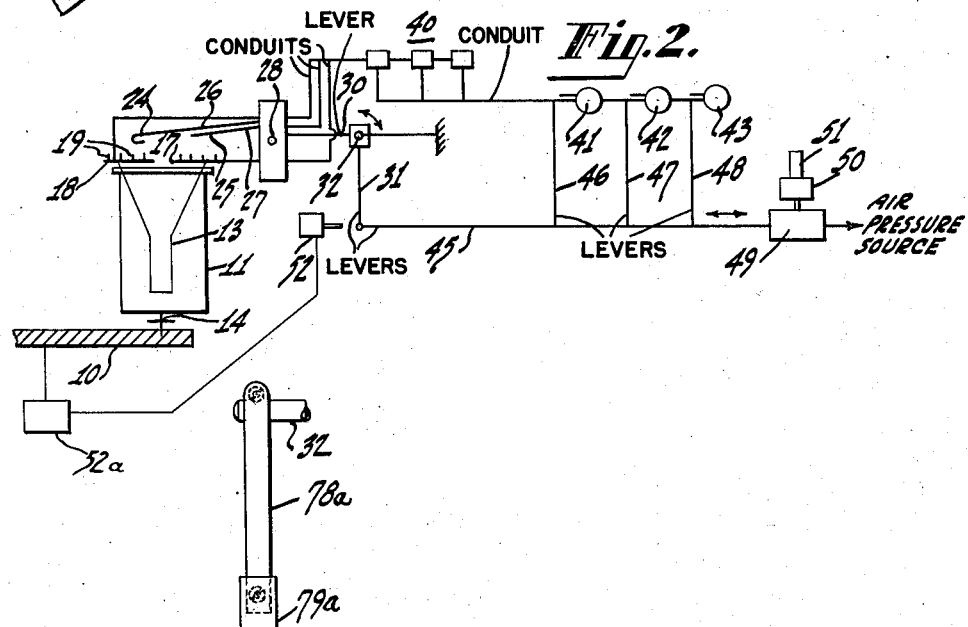
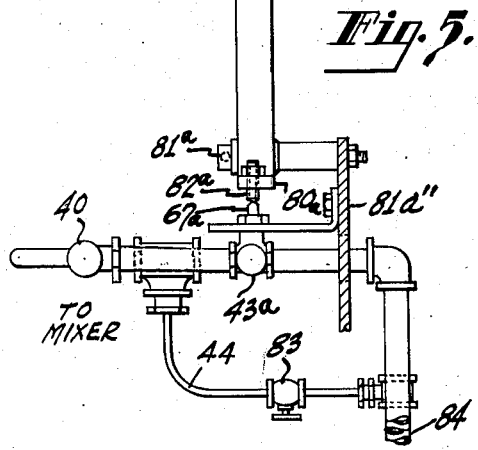
Inventor
ANDREW L. LUCARELLI
By William A. Zaluak
Attorney

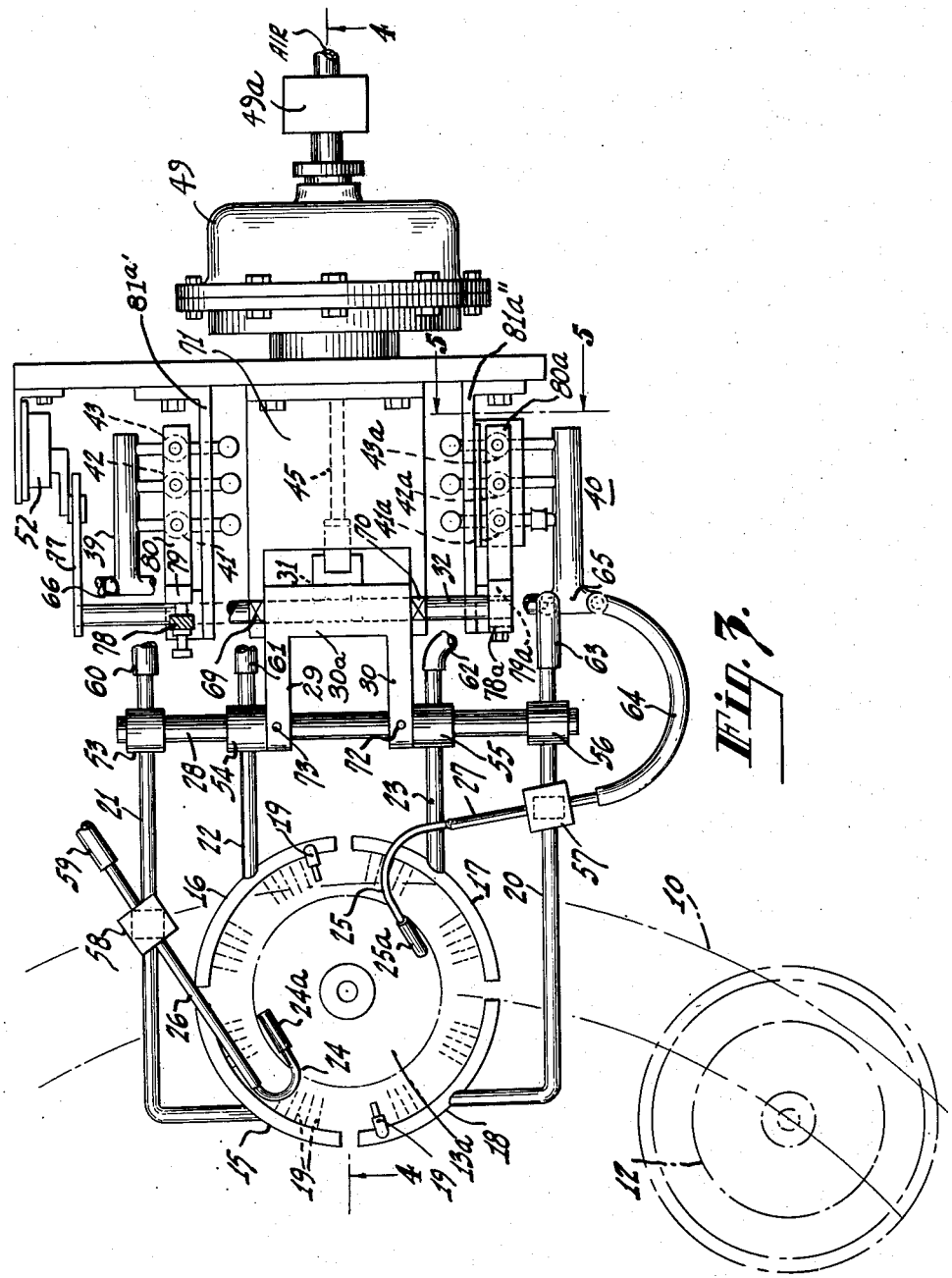

Oct. 6, 1953  A. L. LUCARELLI  2,654,181
SEALING APPARATUS
Filed Nov. 15, 1949  3 Sheets-Sheet 3
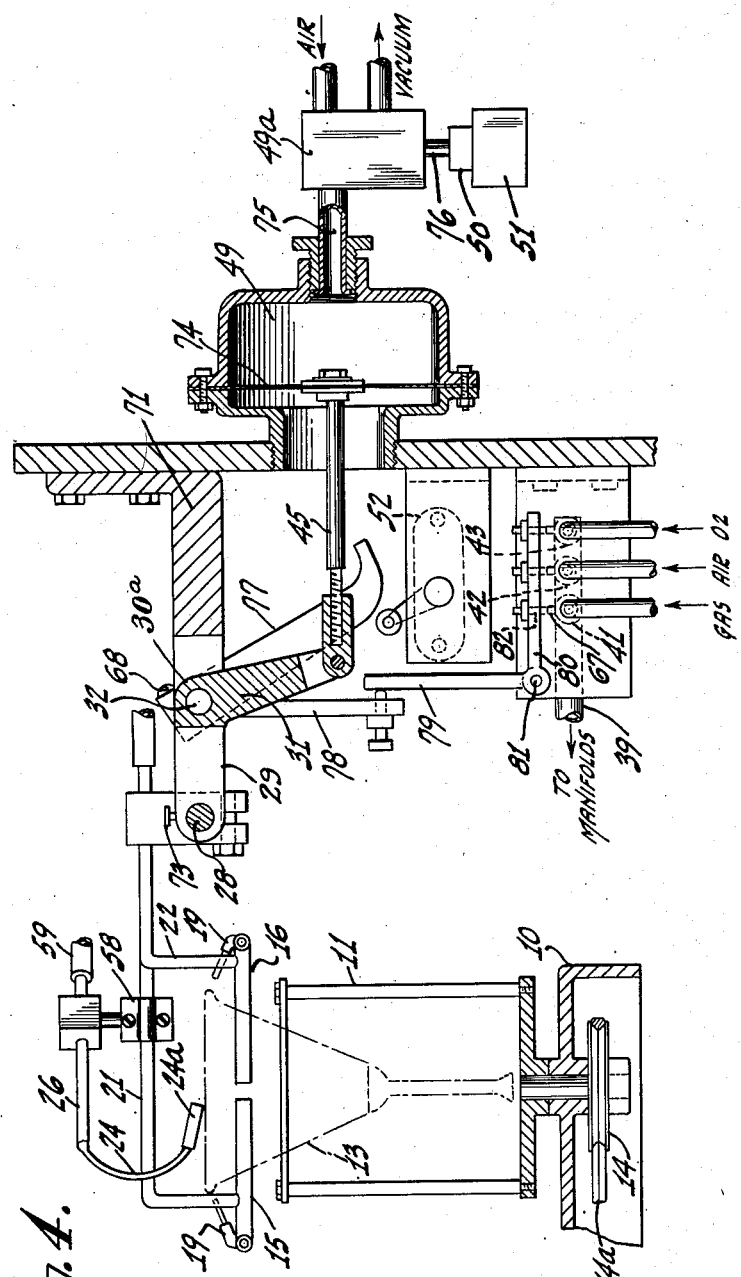
Inventor
ANDREW L. LUCARELLI
By
William A. Zalesak
Attorney Patented Oct. 6, 1953

2,654,181

UNITED STATES PATENT OFFICE 2,654,181

SEALING APPARATUS

Andrew L. Lucarelli, Lancaster, Pa., assignor to Radio Corporation of America, a corporation of Delaware Application November 15, 1949, Serial No. 127,419

8 Claims. (Cl. 49—1)

My present invention relates to a sealing apparatus for sealing and more particularly to a sealing apparatus of the burner type for sealing relatively large size glass-to-metal work pieces.

In the manufacture of some types of cathode ray tubes, such for example, as the metal cone type having a glass face plate of large diameter, for example, 16 inches and larger, the operation of sealing the face plate to the cone presents many problems in view of the relatively large and strong seal required. One problem concerns the selection of the appropriate type of heat source for accomplishing the seal. The two heat sources generally available are the burner type of heater which provides flames for heating work pieces at the location of a desired seal, and the electrical type which heats as a consequence of electrical currents induced in the work.

I have found that at present the most advantageous type of heat source for this type of work is that provided by the burner type of heater, particularly where glass constitutes one of the work pieces to be sealed and the seal is relatively large. Furthermore, where a relatively strong seal is required, the better annealing action provided by the burner type of heater is of advantage.

While I have found the burner type of heater more suitable for relatively large and strong seals, the use of this type of burner gives rise to additional difficulties. Some automatic sealing machines include a turret having a plurality of rotatable heads or supports for work pieces, such as tube parts to be sealed. The turret is usually rotated intermittently so that the work pieces are successively disposed for a predetermined time interval at each of a plurality of stations. Some of these stations are provided with burners having two or more spaced portions or segments disposed on opposite sides of the path of travel of the work pieces through the stations to thereby provide free travel of the work pieces to and from the burners. Where relatively small work pieces are concerned the continuous rotation thereof on the turret heads and the relatively small spacing required between the burner portions, permit a substantially uniform and continuous heating of the entire seal portion of the work pieces.

However, where relatively large work pieces are involved such as the metal cone and the face plate of the 16" cathode ray tube, a relatively large spacing is required between the portions or segments of the burner to provide the relatively wide path required for travel of the tube into and out of desired operative position with respect to the burner. This relatively large spacing would result in a non-uniform heating of the periphery of the work pieces at the seal location notwithstanding the rotation of the work pieces on a turret head. Such rotation would move successive portions of the periphery of the work pieces successively through the heat zone provided by the burner and the relatively cool zone between the burner segments. During the transit of a peripheral portion of the work pieces through the cool zone referred to some of the heat imparted thereto at the heat zone would be dissipated and an added burden would be placed on the next heat zone to reheat the cooled portion. This intermittent cooling of the portion of the work pieces might render it impractical to raise the work pieces to the temperature required for a good seal. The intermittent cooling and heating of a peripheral portion of the work pieces would also give rise to strains in the work pieces that would be difficult, if not impossible, to remove.

As a consequence a substantially closed array of burners is required where relatively large work pieces are sealed. But this raises a further problem residing in the necessity for maintaining the turret of the machine stationary during the disposition of the work pieces within the burner array. If the turret were free to index while the burners surround a work piece, serious damage would result to both the work piece and the burners.

Another difficulty results from the relatively large heat quantity required for sealing relatively large work pieces. While this large heat quantity is necessary for manufacturing a good seal during a portion of the cycle of operation of the machine, it is objectionable during other portions of the cycle when it is not required to heat work pieces. During such other portions of the cycle, the flames are free to heat adjacent structural portions of the machine to thereby impair their usefulness as a consequence of expansion or otherwise. This unnecessary use of the burner also involves a waste of the relatively expensive gases serving as the fuel.

Another problem is presented where relatively large work pieces are sealed. This problem concerns the need to heat portions of the work pieces displaced from the seal location to prevent harmful strains in the finished product.

A further problem is presented where it is desired to seal glass to metal. To heat the glass and metal equally in making the seal might result in liquifaction of the glass or other deformation thereof.

Another difficulty concerns the fuel distribution to a group of burners disposed for heating a relatively large work piece. A relatively large number of burner nozzles are required that are called upon to provide uniform flames. Unless the fuel is supplied uniformly to the burner nozzles, the flames will lack uniformity.

Accordingly it is the object of the invention to provide an improved sealing apparatus.

Another object is to provide a sealing apparatus for advantageously sealing relatively large work pieces having an extensive seal region.

A further object is to provide a sealing apparatus utilizing burners capable of disposition around relatively large work pieces to be sealed and providing a free path for travel of the work pieces to and away from the burners.

Another object is to provide a sealing machine for simultaneously heating certain portions of relatively large work pieces for accomplishing a seal therebetween and heating other portions for annealing purposes.

A further object is to provide a sealing machine of the burner type wherein the fuel for the burners is automatically reduced during intervals between sealing cycles.

Another object is to provide a sealing machine having burners disposed in a predetermined and substantially closed array around a relatively large work piece and movable with respect to the work piece to provide a path for the same to and from the center of said array.

A further object is to provide a sealing apparatus having burners hingedly supported for pivotal movement on a horizontal axis for raising said burners above the path of travel of a work piece to and away from operative positions with respect to said burners.

Another object is to provide a sealing apparatus having hingedly supported burners, a fuel supply for the burners, and synchronized means for rotating the burners at their hinged support and reducing said fuel supply.

A further object is to provide a burner type sealing apparatus for sealing relatively large size work pieces and having one group of burners for heating portions of the work pieces for accomplishing a desired seal, and other burners for heating other portions of the work pieces spaced from the first mentioned portions for reducing the heat gradient between the seal location and portions spaced from said location to prevent strains in the work pieces.

Another object is to provide a sealing apparatus having a burner including a relatively large number of burner nozzles for heating uniformly a relatively large work piece wherein the fuel supply to the burner nozzles is substantially uniform to provide uniform flames from the several nozzles.

A further object is to provide a sealing apparatus having an intermittently movable work supporting turret, a burner ring substantially entirely surrounding the work during sealing cycles and movable to permit the work to travel to and away from operative position with respect to the burner ring, and a cycle control for preventing movement of said turret when the burner ring is in operative position with respect to the work.

Another object is to provide a burner type of sealing machine for processing relatively large cathode ray tubes having a metal cone and glass face plate, and more specifically for sealing said face plate to the wider end of said metal cone with economy in fuel consumption and without interference between said burners and said face plate and cone during travel of said face plate and cone to and from an operative position with respect to the burners of said machine.

According to one way of practicing the invention a sealing apparatus may be provided with burners disposed in a substantially closed circular array. The burners may comprise four separated quadrants independently supplied with fuel to render the fuel supply to each of the burner nozzles substantially uniform. The four quadrants are supported in fixed relation with respect to each other as a unit on a structure pivoted on a horizontal axis to permit the burner unit to be swung out of the path of travel of a work piece. The work piece which may be relatively large such as a 16" cathode ray tube, is supported on a rotating head of an intermittently movable turret for movement of the work piece into and out of operative position with respect to the burner unit. The pivoted support for the burner unit includes an integral arm or lever to which a force may be applied for rotating the support and swinging the burner unit upward and beyond the upper extremity of the work piece. A switch for actuating the intermittently movable turret is disposed in the path of travel of the lever or arm referred to as a consequence of which movement of the turret take place only when the burner unit has been raised above the work piece. My apparatus may thus be controlled by a control which determines the raising and lowering of the burner unit, such movement of the burner unit in turn controlling the intermittent movement of the turret on which the work piece is supported.

The lever or arm referred to is also mechanically coupled to an economizer unit comprising a plurality of valves for supplying different elements of the fuel fed to the burners. These valves are preferably spring urged to closed position and the mechanical coupling referred to is arranged to overcome the force of the spring referred to when the burner unit is lowered to operative position. A by-pass on one or more of the valves may be provided for pilot operation of the burners when in the raised position.

In addition to the circular array of burners for directing flames to the location of a desired seal on work pieces, my apparatus also includes additional burners for directing flames to portions of the work pieces remote from the location of the seal, for example, the center portion of a glass face plate to be sealed to a metal cone of a cathode ray tube, for preventing strains due to an excessive heat gradient between different portions of the work pieces. Where a glass-to-metal seal is desired it is advantageous to shield the glass from the relatively high intensity fires used to heat the metal. When the metal cone of a cathode ray tube forms one of the work pieces, the flare of its wider end may serve as the desired heat shield.

Further objects and advantages will become apparent from a consideration of the following and more detailed description taken in connection with the accompanying drawing.

Referring to the drawing:

Figure 1 shows a plan view of a schematic arrangement of a sealing machine according to the invention;

Figure 2 shows a side view, partly in section of the schematic arrangement of Figure 1 and along the line 2—2 of Figure 1;

Figure 3 is a plan view of apparatus at the sealing station of a turret type sealing machine including the features of the invention;

Figure 4 is a sectional side elevation of the structure shown in Figure 3 and taken along the line 4—4 of Figure 3; and Figure 5 is a sectional view along the line 5—5 of Figure 3.

Referring in more detail to the drawing and considering first the schematic representation of the invention shown in Figures 1 and 2 for a more ready appreciation of the elements of the invention and their relationships, a sealing machine incorporating the invention may include a turret 10 having a plurality of heads 11 for supporting work pieces 12, 13 which may be cathode ray tubes having metal cones to which it is desired to seal glass face plates. The turret is movable intermittently to dispose the work pieces successively in operative relation with apparatus provided at a plurality of work stations. Each head or support 11 is rotated by means of a pulley 14 for a uniform processing of the work piece at the several stations.

The present invention is primarily concerned with the sealing station of the machine at which work pieces are heated at predetermined portions thereof where a seal is desired, to a temperature sufficiently high for accomplishing the seal. At this sealing station, as shown in Figures 1 and 2 there is provided a burner unit comprising 4 quadrants 15, 16, 17, 18, each having a plurality of burner nozzles 19 for directing flames to the seal location. The burner quadrants are supported on rigid conduits 20, 21, 22, 23 which also serve to supply fuel to the burners. The burner unit also includes two burner nozzles 24, 25 for heating locations on work pieces spaced from the seal location. This is for the purpose of reducing strains in the work pieces, such as might arise as a consequence of severe temperature gradients between peripheral portions of the work to which sealing flames are applied, and central portions spaced from the sealing flames. The function of the burners 24, 25, is therefore to anneal the workpiece by reducing said temperature gradients. These nozzles are supported by rigid conduits 26, 27 which also feed fuel to these burner nozzles. All the rigid conduits referred to are fixed to a shaft 28 by suitable clamps whereby the conduits and burners referred to are restrained against movement with respect to each other.

The rigid conduits referred to are connected by flexible conduits 33 to 38 to two sets of mixers 38, 40 to which fuel, for example, in the form of gas, air and oxygen is fed and by which these gases are mixed. Both mixers are connected to an economizer comprising three valves 41, 42, 43 urged by springs to closed position. These valves control the supply of gases referred to to the mixers. Valve 41 may be by-passed by conduit 44 to provide pilot operation of the burners.

The shaft 28 is supported by suitable clamps on a pivotally mounted lever structure including arms 29, 30 and arm 31 disposed at right angles to arms 29, 30. This structure is pivoted on shaft 32 for rotation thereon on a horizontal axis.

Disposed to abut against the free end portion of lever or arm 31, is a link 45 having fixed arms 46, 47, 48 for engaging valve pins provided on the valves 41, 42, 43. Link 45 is connected to actuating means which may be an air cylinder 49, for moving the link to the right or left as viewed in Figures 1 and 2 to simultaneously either raise the burner and shut the valves 46, 47, 48, or to lower the burner and permit the valves referred to to open. Air cylinder 49 is in turn actuated by solenoid 50 which is controlled by timer 51.

A switch 52 is provided to actuate the turret 10 in an intermittent movement. This switch is adapted to successively open and close an electrical circuit connected to motor 52a. Motor 52a is connected in power transfer relation to turret 10 for imparting intermittent movement thereto as shown in Figure 2. When switch 52 is open as shown, the turret is stationary. When link 45 actuates lever 31 to raise the burner, lever 77 also abuts against switch 52 to close the same. This closing of switch 52 results in one intermittent movement of turret 10. It will be noted that this intermittent movement cannot occur while the burner is down and in operative position with respect to the work.

Air cylinder 49 may be of a type well known in the art for providing a one way thrust on link 45 to the left as viewed in Figures 1 and 2, the return movement of the link to the right being accomplished by the force exerted by the weight of the burner unit when the thrust of cylinder 49 on link 45 is released. Alternately, cylinder 49 may, in addition, be connected to a vacuum source for aiding the lowering movement of the burner unit.

In Figures 3, 4 and 5 is shown one form of apparatus adapted to perform the functions schematically indicated in Figures 1 and 2. As depicted in Figures 3 and 4, the sealing machine of the invention includes a turret 10 rotatable in a horizontal plane on its vertical axis in intermittent steps. Adjacent the periphery of the turret 10 are disposed a plurality of heads or work supports 11, supporting work pieces such as elements of cathode ray tubes 12 and 13. Each head is continuously rotated by means of pulley 14 and belt 14a connected to a suitable power source, not shown. This rotation of the head contributes to a uniform processing of the work pieces supported thereon.

The intermittent movement of the turret 10 is sufficient for travel of a head from one to the other of adjacent processing stations. One type of sealing machine is provided with eight processing stations through which work pieces are successively carried. These stations include loading stations, sealing stations, annealing stations and unloading stations. In Figures 3 and 4 apparatus according to the invention is shown which may be employed at the sealing station.

This apparatus includes a burner unit comprising manifold quadrants 15, 16, 17, 18, each quadrant having a plurality of burner nozzles 19 directed to a periphery of the work pieces, such as the wider end of a metal cone 13 which supports glass face plate 13a of a cathode ray tube, which it is desired to seal.

It will be noted from Figure 4 that the nozzles 19 extend angularly upward from a horizontal plane. This is for the purpose of directing flames perpendicularly to the wider flared end portion of the cone. This arrangement of the nozzles and the flared portion of the cone permits an advantageous method to be practiced. According to such method its flared wider end portion of the metal cone serves as a shield to protect the glass face plate from the intense heat provided by the nozzles on the manifold quadrants.

The burner unit also includes two burners 24, 25 having nozzles 24a, 25a supported in a manner to direct relatively low intensity flames to the upper surface of the glass face plate 13a, at portions thereof displaced from its periphery to avoid an excessive temperature difference between peripheral and central portions of the face plate and thus preventing appreciable strains therein.

The burners 15, 16, 17, 18, 24, 25 comprise rigid conduits which may be metallic. These rigid conduits are supported on additional rigid metallic conduits 20 to 23 and 26 and 27, which are in turn fixed by suitable clamps 53 to 58 to a shaft 28 in such a manner that the burners referred to are restrained against movement with respect to each other.

The additional rigid conduits referred to 20 to 23 and 26 and 27 extend through the clamps referred to and are connected to flexible conduits 59 to 64, which may be rubber hose. These flexible conduits are divided into two groups, each group being connected to a separate manifold 65, 66 shown in Figure 3. To manifold 65 are connected flexible conduits 62, 63, 64 and to manifold 66 are connected flexible conduits 59, 60, 61. The arrangement of the conduits into two groups served by separate manifolds results in an improved distribution of the gaseous fuel to the burners.

The manifolds 65, 66 are connected to mixers 40, 39, respectively, in which the different gases, comprising the fuel, are mixed in a well known manner. The mixers 39, 40 are each connected to independent supplies of gases which may be illuminating gas, air and oxygen, as shown in Figure 4. Between each of the mixers and fuel supply is disposed an economizer unit comprising three valves controlling the supply of each of the three gases referred to. The economizer unit serving mixer 39 comprises valves 41, 42, 43 and the economizer unit associated with mixer 40 includes valves 41a, 42a, 43a. Each of these valves is provided with a control pin 67 shown in Figure 4, which is spring urged to outwardly extending position to close the valves. The economizers are actuated in a manner that will become clear from a consideration of other structural elements of the apparatus being described.

Such other structural elements include a lever 30a having parallel arms 29, 30 and arm 31 disposed at an angle with respect to arms 29, 30 as shown in Figure 4. Lever 30a is fixed to shaft 32 by suitable means such as screw 68 shown in Figure 4, shaft 32 in turn being mounted for rotation in suitable bearings 69, 70 provided on fixed bracket 71 as shown in Figure 3. The free ends of arms 29, 30 are fixed to shaft 28 to which the burner unit is fixed, by suitable means such as screws 72, 73 as a consequence of which lever 30a is restrained against movement relative to the burner unit referred to.

Arm 31 of lever 30a is connected at its free end to one end of link 45 as shown in Figure 4. The other end of link 45 is fixed to the central portion of diaphragm 74 of a power transfer unit 49 which may be of a type known under the trade name of "Robotaire." The unit 49 is connected by a conduit 75 to valve 49a which may alternately feed air under pressure to unit 49 or connect the same with a vacuum chamber. Valves of this type are well known in the art and further description thereof is not believed necessary. The valve 49a is connected to a solenoid 50 by means of a pin 76 for actuation of said valve. The solenoid 50 is in turn connected to a timer 51 of well known structure for actuating the solenoid.

On shaft 32 is also fixed lever 77 for movement in synchronism with arm 31 of lever 30a. The free end of lever 77 is adapted to trip switch 52 to closed position, the switch being normally urged to open position. The switch 52 is electrically connected to the actuating means, for the intermittently moving turret 10.

Also fixed to shaft 32 is a lever 78 the free end of which is adapted to actuate a lever having arms 79, 80. The last mentioned lever is pivoted on a shaft 81 mounted on fixed bracket 81a'. The arm 80 is provided with pins 82 for abutting against pins 67, of the economizer unit serving mixer 39 as shown in Figure 4. A raising of the burner unit of the apparatus therefore results in release of pins 67 of the economizer as a consequence of the release of the downward pressure by arm 80 on the pins 67. Since these pins are urged to closed position valves 41, 42, 43 of the economizer will close. An additional set of levers 78a, 79a, 80a similar to lever 78 and the lever having arms 79, 80, shaft 81a similar to shaft 81, pins 67a, 82a similar to pins 67, 82, and bracket 81a'' similar to bracket 81a' are disposed on the side of the apparatus opposite to that on which the last named levers appear as shown in Figure 5. The two sets of levers are designed to actuate the two economizers disposed on opposite side portions of apparatus as shown in Figure 3 and operate in synchronism.

To provide pilot operation of the burner unit when the valves of the two economizer units are closed, two by-pass conduits, one of which is shown at 44 having a valve 83, are disposed to by-pass valves 41 and 41a to permit a limited flow of gas to the burners, as shown in Figure 5. The pilot by-pass conduit 44 is connected between conduit 84 of the gas supply line and the mixer 40.

In operation, and starting with the burner unit in downward position, timer 51 which may be set to operate in a predetermined intermittent manner, actuates solenoid 50 to open valve 49a to a source of air pressure. Air under pressure enters power transfer device 49 to cause the diaphragm 74 of the latter to flex to the left as viewed in Figure 4. This flexing movement of the diaphragm will be transmitted through link 45 to lever 30a causing the latter to rotate in a clockwise direction. This rotation of the lever results in rotation of the burner assembly to a position above the work pieces 13. This rotation of lever 30a also causes rotation of shaft 32 and the levers 77, 78 fixed thereto. Rotation of lever 77 in a clockwise direction causes it to trip switch 52 to close the circuit actuating the turret 10 in intermittent movement. Rotation of lever 78 releases pressures on lever arm 79 causing lever arm 80 integral therewith to release pressure on the economizer valves 41, 42, 43. A similar lever 78a, releases pressure on lever arm 79a, shown in Figure 3, causing lever arm 80a fixed thereto to close economizer valves 41a, 42a, 43a to shut off the fuel flow to the burners. Some gas, however, will flow through the by-pass conduits referred to to permit pilot operation of the burners.

It will be noted that the arrangement described for movement of the burner upwardly above the work pieces before the turret is actuated, is of extreme importance to prevent collision between the work pieces carried by the turret and the burner quadrants arranged horizontally around the work pieces.

At the end of the interval started by raising the burner above the work pieces, the timer 51 will cause solenoid 50 to close the valve 49a to the air supply and open communication with a vacuum chamber. This will cause the power transfer unit 49 to move link 45 to the right as viewed in Figure 4, resulting in counterclockwise rotation of the burner unit and a lowering thereof to a position around the work piece 13. This causes lever 77 to release its pressure on switch 52 resulting in an opening of switch 52 and a positive stoppage of further actuation of turret 10. The counterclockwise rotation also results in actuation of lever arms 80, 80a in rotary movement in a clockwise direction as a result of which arms 80, 80a press down on pins 67, 67a on the two economizer units to open the valves thereof for full energization of the burners.

My novel sealing apparatus is particularly advantageous in sealing a glass face plate to a metal cone of a relatively large cathode ray tube. Metal cones employed for such tubes usually are provided with an outwardly extending flare at the wider end thereof at which the face plate is to be sealed. The flare is usually wider than the face plate so that the latter extends within the wider end portion of the cone. This flare contributes to several advantages in accomplishing a seal with my novel apparatus. It provides a means for critically seating the face plate in the cone and serves as a shield to protect the face plate from the relatively high intensity flames used in the ring-like burner array for making a seal between the cone and the face plate. If the flames were permitted to strike the face plate directly, it is likely the glass would soften and run away from the location at which a seal is desired. Some heating of the glass plate occurs, however, as a consequence of heat conduction from the heated cone flare. This heat is desirable to soften the glass adjacent the periphery of the plate sufficiently for making the seal. However, central portions of the plate do not receive any appreciable amount of this heat and accordingly remain relatively cool. This difference in temperature between peripheral portions of the glass plate and central portions thereof may set up harmful strains in the plate that might adversely affect the strength of the finished tube.

Accordingly, my apparatus provides for heating such central portion of the plate. This centration portion of the plate may extend relatively close to the periphery and is not to be interpreted as comprising a relatively small central portion of the plate but is intended to include all portions of the plate not heated by the heated cone rim. For heating such central portion of the glass plate my apparatus includes one or more burner nozzles in addition to the ring-like array of burners, which are adapted to direct flames of relatively low heat intensity to such central portion of the plate.

The heating of the central portion of the plate is referred to herein as an annealing action since its purpose is to relieve strains that otherwise might be set up in the glass plate due to relatively large temperature gradients therein.

It will thus be apparent that I have provided a novel and advantageous sealing apparatus for sealing relatively large work pieces requiring a substantially closed fire ring around the portions to be sealed. The arrangement of the burner segments in fixed relation with respect to each other and mounting them on a rotatable support, results in the convenient utilization of a hinged mounting for moving the burner above the work piece to provide unobstructed movement of the work pieces to an adjacent station. The apparatus according to the invention moreover provides for a control of the fuel fed to the burner that is synchronized with the movement of the burner to automatically reduce the amount of such fuel during intervals when the burner is inactive and raised from the work. Another feature of the invention that contributes advantages in sealing relatively large work pieces is the disposition of some of the burner segments for heating portions of the work pieces remote from the location of the seal, to prevent strains.

While the invention has been described in connection with a specific embodiment thereof, it is obvious that modifications and substitutions may be made in said embodiment without departing from the spirit of the invention, and it is accordingly intended that departures from the embodiment described within the realm of equivalents be included within the scope of the appended claims.

I claim:

1. A burner system for sealing a glass face plate to a metal cone of a cathode-ray tube, said system comprising a plurality of arcuate hollow members defining a substantially closed array, each of said members having a plurality of nozzles for directing fires to a periphery at the wider end of said cone for heating said periphery and edge portions of said glass face plate seated therein for forming a seal therebetween, tubular supports for said members having interiors communicating with the interiors of said members, a shaft mounted for pivotal movement on its axis and spaced laterally from said members, said tubular supports being fixed to said shaft for rotation therewith and for sole support thereby, and power transfer means connected to said shaft for pivotally moving said supports, said arcuate hollow members and said nozzles away from said cone and face plate, whereby said burner system is adapted to process successively a plurality of intermittently moving cones and face plates.

2. A burner for sealing a glass face plate to a metal cone of a cathode-ray tube comprising a plurality of nozzles disposed in an array for directing fires to a periphery of said cone, a plurality of rigid conduits, a plurality of said nozzles being connected to each of said rigid conduits for uniform distribution of fuel to said nozzles, a shaft mounted for pivotal movement on an axis disposed to one side of said array, said rigid conduits being fixed to said shaft for sole support thereby, and means for pivotally moving said shaft, whereby said nozzles are moved away from said face plate and cone after completion of a sealing operation, and a sealed face plate and cone are adapted to be moved laterally away from said array to a further processing station.

3. A burner adapted to seal relatively wide work pieces traveling intermittently in a predetermined path, said burner including a plurality of manifolds disposed in a substantially closed array in said path and each having a plurality of nozzles directing flames inwardly of said array to heat a continuous peripheral portion of said work pieces at a region of juncture thereof, a plurality of rigid conduits for said manifolds for uniform distribution of fuel thereto, a shaft supported for axial pivotal movement adjacent one side of said path, said rigid conduits being fixed to said shaft for sole support thereby and pivotal movement therewith, and power transfer means connected to said shaft for pivoting the same to successively dispose said nozzles around said peripheral portion of the work pieces for making a seal therebetween, and to raise said nozzles to a position above said work pieces whereby said work pieces are free to move in said path from said burner after completion of said seal.

4. A burner adapted to heat the peripheries of contiguous portions of relatively large work pieces to form a seal therebetween, said burner including a plurality of nozzles forming a substantially closed array in one plane and directing fires inwardly of said array, a fixed support disposed to one side of said array, a shaft mounted on said support for axial pivotal movement and extending parallel to said plane, said nozzles being mounted on said shaft for pivotal movement therewith, a plurality of conduits for uniformly supplying fuel to said nozzles, and power transfer means connected to said shaft for pivotally moving the same successively in one direction to dispose said array of nozzles around said periphery to form a seal, and in the opposite direction to displace said array from said work pieces, whereby said work pieces are free to move away laterally from said burner in said plane.

5. A sealing apparatus comprising an intermittently movable turret having supports for workpieces to be sealed, a burner forming a substantially closed ring, a support for said burner pivoted at one side of the burner ring for arcuate movement, means for arcuately moving said support to dispose said burner ring in a position around a predetermined peripheral portion of the workpieces, a lever movable with said support, and a switch responsive in opening to said lever when said burner ring is moved to said position for holding said turret stationary when said burner ring is in said position.

6. A sealing apparatus comprising an intermittently movable turret, a work supporting head on said turret, a burner adjacent said turret forming a substantially closed array in one plane, pivoted support means for said burner movable to successively dispose said substantially closed burner array around a peripheral portion of work pieces to be sealed, in a plane parallel to the direction of intermittent movement of said turret and to move said burner array perpendicularly with respect to said turret and away from the work pieces, a switch for controlling the intermittent movement of said turret, and a lever fixed to said support means and movable therewith for successively opening and closing said switch for initiating intermittent movement of said turret in response to the position of said burner array with respect to the work pieces, whereby said turret is moved only when said burner array is in a position away from the work pieces.

7. A sealing apparatus comprising an intermittently movable turret having a plurality of heads for supporting relatively large work pieces for travel laterally through a plurality of work stations including a sealing station, burners at said sealing station for sealing the work pieces at a desired portion thereof and annealing the work pieces at other portions thereof spaced from said portion, one group of said burners forming a substantially laterally closed array for receiving the work pieces on one of said heads, a fuel supply for said burners, a fuel valve for controlling fuel to said burners, and means for simultaneously pivoting all of said burners to a position above the work pieces, starting movement of said turret, and reducing the fuel supply to said burners, to permit further lateral travel of the work pieces in response to intermittent movement of said turret and to secure economy in fuel consumption, said last-named means including a pivotally supported shaft, said burners being fixed to said shaft, a switching member fixed to said shaft for controlling the movement of said turret, and a lever fixed to said shaft and adapted to control said fuel valve.

8. In a sealing apparatus including an intermittently movable turret, and supporting means on said turret for supporting relatively large work pieces, the improvement comprising a burner unit having burners forming a substantially closed array around a peripheral portion of the work pieces for heating said portion to a sealing temperature, said burner unit having an additional burner spaced from the plane of said closed array for heating portions of the work pieces spaced from said peripheral portion for preventing strains therein, a fuel supply for said burner unit, a rotatable shaft supported laterally of said unit, said unit being fixed to said shaft, means for rotating said shaft through an arc of less than 90° for raising said burner unit above the work pieces to permit the work pieces to travel away from the burner unit during an intermittent movement of said turret, and a lever fixed to said shaft and extending to said fuel supply for reducing the supply of fuel to said burner unit during said intermittent movement.

ANDREW L. LUCARELLI.

References Cited in the file of this patent

UNITED STATES PATENTS

| Number | Name | Date |
|---|---|---|
| 916,209 | Smallwood | Mar. 23, 1909 |
| 1,351,770 | Lemoine | Sept. 7, 1920 |
| 1,420,921 | Godfrey | June 27, 1922 |
| 1,530,884 | Conde | Mar. 24, 1925 |
| 1,591,716 | Madden et al. | July 6, 1926 |
| 1,655,140 | Fagan | Jan. 3, 1928 |
| 1,757,211 | Parker | May 6, 1930 |
| 2,085,790 | Campbell | July 6, 1937 |
| 2,164,285 | Schutz | June 27, 1939 |
| 2,237,186 | Malloy | Apr. 1, 1941 |
| 2,296,307 | Power | Sept. 22, 1942 |
| 2,349,822 | Gardner | May 30, 1944 |
| 2,446,000 | Eisler | July 27, 1948 |
| 2,482,494 | Knochel et al. | Sept. 20, 1949 |

FOREIGN PATENTS

| Number | Country | Date |
|---|---|---|
| 544,066 | Germany | Feb. 13, 1932 |